United States Patent [19]

Crowley

[11] Patent Number: 5,253,073
[45] Date of Patent: Oct. 12, 1993

[54] ELECTRONIC DATA MULTIPLEXING IN A FULL COLOR PULSED LASER PROJECTOR AND METHOD

[75] Inventor: Ronald P. Crowley, Salem, Mass.

[73] Assignee: Corporation for Laser Optics Research, Wellesley, Mass.

[21] Appl. No.: 861,915

[22] Filed: Apr. 1, 1992

[51] Int. Cl.⁵ .............................................. H04N 5/74
[52] U.S. Cl. .................................... 358/231; 358/60; 358/235; 359/132; 359/305
[58] Field of Search ................... 358/60, 61, 231, 235; 359/308, 309, 312, 132, 305, 311

[56] References Cited

U.S. PATENT DOCUMENTS

| | | | |
|---|---|---|---|
| Re. 29,670 | 6/1978 | Spaulding | 358/60 X |
| 3,783,185 | 1/1974 | Spaulding | 358/235 |
| 3,818,129 | 6/1974 | Yamamoto | 358/235 |
| 3,894,182 | 7/1975 | Yamamoto et al. | 358/235 |
| 3,935,566 | 1/1976 | Snopko | 358/235 |
| 3,944,335 | 3/1976 | Saito et al. | 359/308 X |
| 3,953,107 | 4/1976 | Yano et al. | 359/308 X |
| 4,293,195 | 10/1981 | Mori | 359/312 |
| 4,505,550 | 3/1985 | Steinbruegge | 359/308 X |
| 4,602,342 | 7/1986 | Gottlieb et al. | 359/308 X |
| 4,720,747 | 1/1988 | Crowley | 358/231 |
| 4,851,918 | 7/1989 | Crowley | 358/231 |
| 4,941,208 | 7/1990 | Olshansky et al. | 359/132 |

Primary Examiner—James J. Groody
Assistant Examiner—John W. Miller
Attorney, Agent, or Firm—Richard P. Crowley

[57] ABSTRACT

A multiplexed, multicolored video imaging system which comprises a plurality of pulsed lasers to provide input beams, a single acoustic-optical cell to receive the input beams, a transducer to modulate the input beams in the cell, a signal generator to produce sound waves in the cell corresponding to the electrical signals used for a line image; data compressor to decrease the time of propagation of the sound waves in the cell; multiplexer to provide an electrical signal corresponding to each wavelength to separate and sequentially modulate the video signals to provide a multiplexed, modulated output beam, a projection surface and projector to form a line multiplexed, multicolored output on the projection surface.

27 Claims, 5 Drawing Sheets

ELECTRONIC DATA MULTIPLEXING IN A FULL COLOR PULSED LASER PROJECTOR AND METHOD

TECHNICAL FIELD

The invention relates to video projectors using pulsed lasers for the light source. More specifically, it relates to a single acoustic-optical modulator which produces full color laser video projections.

BACKGROUND OF THE INVENTION

Video projectors employing lasers as a light source, and more particularly, the use of acoustic-optical modulated pulsed laser video projectors are known and described in U.S. Pat. No. 4,720,747, issues Jan. 19, 1988 and U.S. Pat. No. 4,851,918, issued Jul. 25, 1989, both with Ronald P. Crowley. These patents describe a video imaging system responsive to electrical signals representing a video image and employ one or more pulsed lasers, such as metal vapor lasers, to provide one or more monochromatic light sources.

A full color video projector is described employing three separate pulsed lasers to provide light input beams of red, green and blue into an anisotropic acoustic-optical cell with three separate transducers mounted on the cell to produce three separate, collinear, modulated light output beams which produces a full color video image on a projection surface.

It is desirable to provide a new and improved laser video projector and method with electronic data multiplexing for an all solid state, full color pulsed laser projector with no moving parts.

SUMMARY OF THE INVENTION

A multicolored, multiplexed video imaging system and method are disclosed using multiple monochromatic or multichromatic light sources, modulated by RF signals within a single acoustic-optical cell using an isotropic or anisotropic medium for modulation of the light sources. Preferably, diode-based laser sources which are frequency converted from the invisible infrared radiation region to the visible radiation spectral region using non-linear optical crystals or diode-pumped fiber optic-based lasers are used as the light sources. Further, the propagation time of the sound waves in the acoustic-optical cell is to be less than the input video scan line time divided by the number of distinct wavelengths needed to multiplex the multicolored video projection.

A multicolored, multiplexed video imaging system, which system comprises a light source which comprises a plurality of visible pulsed diode lasers or diode-pulsed lasers which are frequency converted from the invisible infrared to the visible radiation region to provide a plurality of separate wavelengths and a mixed, multichromatic input light beam; a single, acoustic-optical cell having an inlet face to receive the input light beam thereon and an outlet face to transmit a multichromatic modulated light means; a single electrical signal to sound wave transducer mounted on a face other than the inlet and outlet faces of the cell to provide a modulated, multichromatic outlet light beam from the outlet face of the cell; signal means to drive said single transducer to produce sound waves within the cell modulated to correspond to the electrical signals for a line of image; compression electronic means to decrease the propagation time of the sound waves in the cell to less than the input video scan line time divided by the number of separate different wavelengths of the input light beam and multiplexing electronics means wherein an electrical signal is selected corresponding to each individual wavelength which wavelengths are separately and sequentially modulated in the cell to multiplex the video signals with the compressed time of the modulated, multichromatic output beam shorter than the input video time of the multichromatic input beam and provide a compressed, multiplexed, modulated output light beam; a projection surface to display on the surface a multicolored video image; and plane projector means to provide for each line of the multicolored, compressed, multiplexed, modulated output light beam to be produced at a different physical location.

A method for displaying a multicolored video image corresponding to electrical signals representing images onto a projection surface, which method comprises providing a plurality of diode-based pumped lasers as a light source and frequency doubling or parametic oscillation of light from the invisible infrared to the visible radiation region to provide a plurality of separate wavelengths; mixing the separate wavelengths from said diode laser to provide a multicolored input light beam; passing the input light beam through a single acoustic-optical cell from an outlet face to an outlet face of the cell; modulating the multicolored input light beam in the cell by a single, electrical signal to sound wave transducer mounted on a cell face other than the inlet and outlet faces of the cell to provide a modulated, multichromatic outlet light beam; providing a signal means to produce sound waves within the cell to correspond to the electrical signal for a line of image; compressing and multiplexing the modulated, multicolored input light beam in the cell to decrease the propagation time of the sound waves in the cell to less than the input video scan line time divided by the number of different wavelengths in the multicolored input light beam and selecting a signal corresponding to each wavelength to separately and sequentially modulate each wavelength with the time of the of the modulated, multicolored outlet light beam from the cell shorter than the input video time of the input light beam and displaying the compressed and modulated, multicolored outlet light beam on a projection surface with each line of the output light beam produced at a different location to provide a multicolor video image on the projector surface.

The multicolored video imaging system and method of the invention permits the employment of a single acoustic-optical cell with a single transducer instead of a single cell with multiple transducers, one for each primary color. The single transducer modules sequentially in the cell the three primary color input beams with electronic means of a timing cycle control scanner and selects the right radio frequency signal corresponding to the individually modulated wavelengths. Thus, the wavelength of the three primary colors are modulated in a single cell by compressing and multiplexing the video signals with the result that an exit light beam comprising multiple collinear light beams of differing wavelengths, which projects a two dimensional video image using a single acoustic-optical cell with one transducer for video modulation and one transducer for perpendicular scanning, thus a cost effective, all solid state, no moving parts, hand-held video projector system.

The light source of the present video imaging system employs diode-based lasers to convert infrared frequencies to visible primary color frequencies by frequency conversion of the light source. For example, a diode laser of 900 nm, 1060 nm or 1260 nm by frequency doubling cuts the wavelength in half to provide 450 nm light (blue), 530 nm (green) or 630 nm (red).

BRIEF DESCRIPTION OF THE DRAWINGS

For a further understanding of the nature and the object of the present invention, reference is made to the following drawings in which like parts are given like reference numerals, and wherein.

DESCRIPTION OF THE EMBODIMENTS

Figure 1:
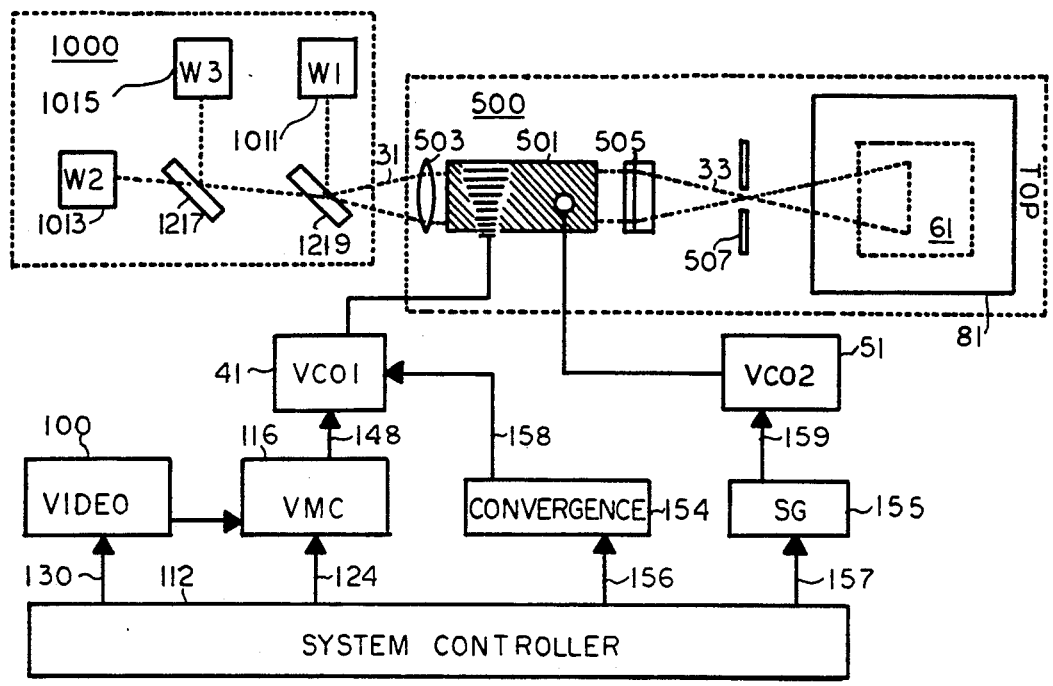
FIG. 1 is a schematic drawing of a multiplexed, multicolor imaging system of the preferred embodiment of the present invention using a single acoustic-optical modulator to modulate the multiplexed multiple video signals. The modulator is used to modulate the video signal and to provide for the perpendicular scanning of the projection system. A multi-wavelength diode-based laser system or diode-pumped fiber system are the preferred light source.

Referring to FIG. 1, there is shown a diode-based laser system 1000 consisting of three infrared pulsed laser diodes, w1, w2, w3; 1011, 1013, 1015, respectively, which are frequency converted to visible wavelengths. The light from the lasers are mixed with dicroic beam combiners 1217 and 1219, which when combined produces a light beam 31 having three wavelengths w1, w2 and w3. This beam 31 is then incident to the modulation system 500. This includes the input anamorphic lens 503 which collimates the input beam 31 to a flat plane the width of the cell 501. Anamorphic output lens 505 focuses the output line 33 through beam block 507 to separate the multiplexed, modulated beam from the through beam of the cell 501 and sets the line width and thickness onto the screen 81.

The configuration of FIG. 1 also uses the acoustic-optical cell 501 in the modulation system 500 as a solid state scanner for the deflection of the multicolor imaging system. The sweep generator SG 155 needed to scan the plane image on the screen 81 is kept in synchronization by signal 157. The output signal 159 controls VC02 51 with a voltage signal that sets the RF oscillator frequency. This determines the diffraction angle of the scanning output of acoustic-optical cell 501. By sweeping the RF frequency of the VC02 driver 51, the position of the output light projected onto the screen 81 of system 500 can be scanned perpendicular to its own plane to produce a full color image of the input video signal 100. Since the diffraction angle is dependent upon the optical wavelength and a multicolor imaging system is used, the deflection angle of two of the wavelengths must be magnified or demagnified to match the third. The signal of 158 can be used to set the appropriate range of scan frequencies for the individual wavelengths w1, w2, w3 to compensate for the misalignment.

The scanning angle from the acoustic-optical modulator/deflector of system 500 is small, on the order of milliradians for isotropic media, a means for angle amplification 61 must be incorporated to increase the plane scanning to an usable deflection angle. An amplification scheme 61 which is well known in the art (Watson and Korpel, 1969; Hrbek et al, 1970, 1971) uses a pair of prisms. The diffraction angle is amplified by the first prism and can be rotated to adjust for the magnification changes as the light is deflected. This causes a misregistration of w1 and w2 images with the w3 image. This misalignment can be cancelled by using two prisms in cascade as shown. It should be noted that the angle amplifier 61 could also be replaced by a computer generated holographic lens. This would yield the most compact system which is the preferred method for angle amplification.

FIG. 1 also contains an electronic means 116 for multiplexing the video signals 100 needed to display a multicolor image onto the screen 81 generated by the modulation system 500. Since there is more than one wavelength incident to the modulation system 500, an electronic convergence means 154, controlled by signal 156 from the system controller electronics 112 is used to select a multiple of RF wavelengths from VC01 41. This control is needed to align the individual wavelengths displayed onto the screen 81. The frequency for each of the individual wavelengths, which are modulated separately from one another must satisfy equation:

$$2 \sin 1 = LW/RW$$

where 1 is equal to the angle of incidence, LW is equal to the light wavelength and RW is equal to the acoustic or RF wavelengths. This equation must be satisfied for all wavelengths incident to modulation system 500. Signal 158 selects the RF frequency 41 while signal 148 amplitude modulates the RF frequency in relation to the incoming video picture information. The three wavelengths w1, w2, w3 are all modulated in one acoustic-optical cell 501 by multiplexing the video signals of the video 100 with VMC 116.

If television video is used, such as NTSC standards, the video information is sampled and stored in video system 100. Instead of reading the red, green and blue information out of the system all at the same time, the VMC 116 controls the video information. For example, the red video information is read first, then the green video and the blue video, multiplexed sequentially, one after the other. Because the time of the multiplexed video is shorter than the input video time than a full color display can be achieved using a single acoustic-optical modulator.

Figure 2:
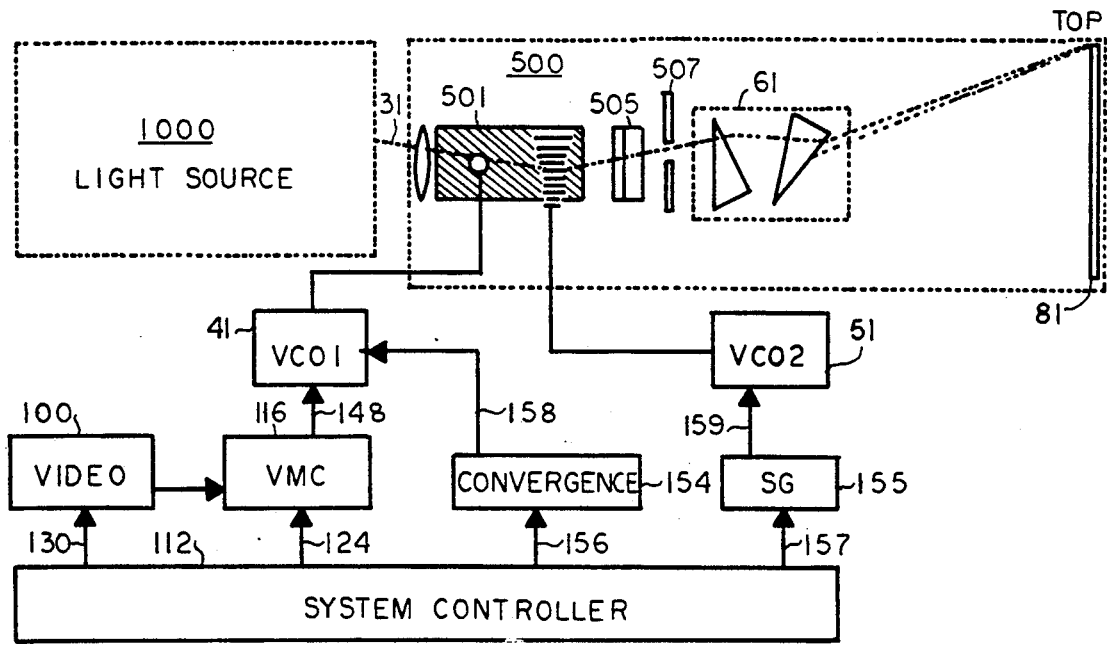
FIG. 2 is a schematic drawing of the multiplexed, multicolored imaging system of FIG. 1 rotated ninety degrees.

Referring to FIG. 2 is a drawing of FIG. 1 rotated ninety degrees.

Figure 3:
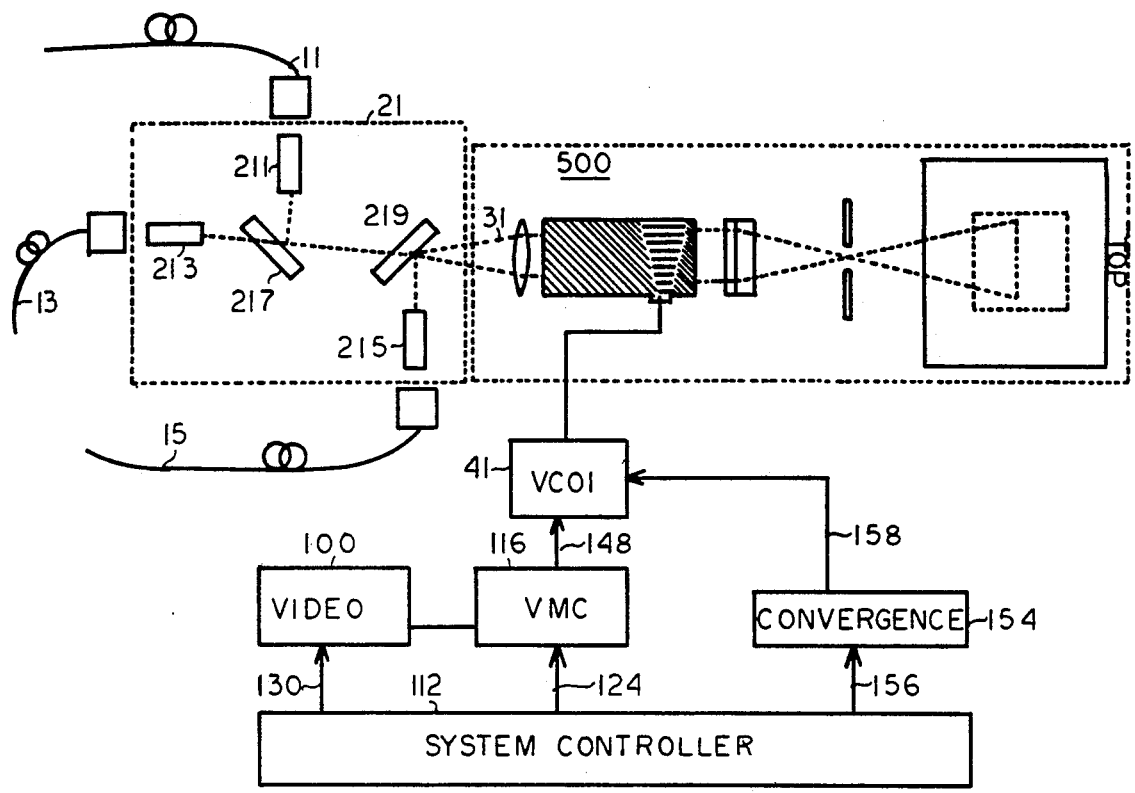
FIG. 3 is a schematic drawing of an alternate embodiment of the multiplexed, multicolor imaging system of the present invention. This embodiment uses a multiple fiber optic cable delivery system to bring the light sources incident to the acoustic-optical modulator.

Referring to FIG. 3, there is shown an alternate embodiment of the present invention which replaces the light source 1000 of FIGS. 1 and 2 with fiber cables 11, 13, 15. The output from these cables are collimated by the gradient index lenses 211, 213, 215 and mixed into one beam 31 by beam combiners 217 and 219. These cables deliver the proper wavelenghts needed from either pulsed laser diodes, pulsed diode-pumped, rare earth-doped fiber lasers or any pulsed light source that meets the requirements of the multicolor imaging system of the present invention.

Alternately, the fiber cables 11, 13, 15 could be laser diode-pumped, rare earth-doped fiber lasers. Fiber lasers can be configured in a variety of ways. Fiber lasers exhibit extremely high gains which have both of the lowest threshold for lasing and the highest slope efficiency of any laser type. Lasing from several transitions in each of the seven of the 13 trivalent rare earth ions, $Er^{3+}$, $Ho^{3+}$, $Nd^{3+}$, $Pr^{3+}$, $SM^{3+}$, $Tm^{3+}$ and $Yb^{3+}$ has been observed. Lasing in glass fibers was first observed in $Pr^{3+}$ and $SM^{3+}$. The $SM^{3+}$ fiber laser at 651 nm red was the first visible glass laser, at 647 nm red pumped 540 nm green $Ho^{3+}$ fiber laser in a floride glass has been observed as well as 480 nm and 455 nm upconversion lasing lines in a $Tm^{3+}$ fiber. A floride fiber doped with $Pr^{3+}$ praseodymium produced lasing action at five transitions 712 nm infrared, 635 nm red, 605 nm orange, 520 nm green and 491 nm blue (Y. Ohishi, T. Kanamori, T. Ritagawa, S. Takahashi, E. Snitzer and G. H. Sigel). This fiber was pumped with infrared radiation at 1.1 um and 0.83 um and operated at room temperature. These fiber lasers have the potential for low cost commercial applications such as HDTV, high definition, home projection television.

Figure 4:
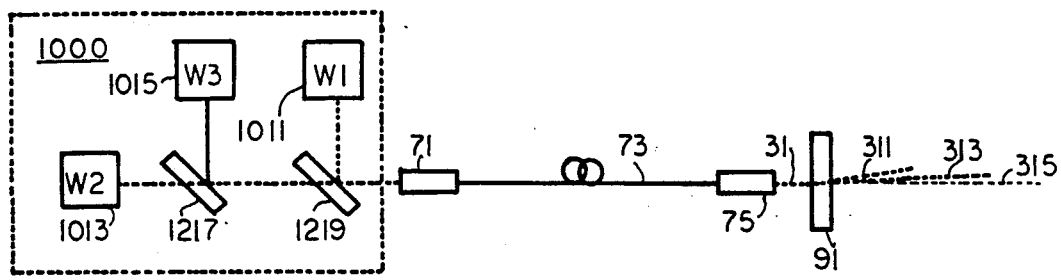
FIG. 4 is a schematic drawing of a light delivery system used by the imaging system of of FIG. 1. The multicolor set of monochromatic light sources are mixed and focused into a fiber optic cable and then collimated at the other end of the fiber cable into a holographic grating plate to disperse the multicolored light incident to the acoustic-optical modulator. Gradient index lenses are the preferred method for the focusing and collimating systems.

FIG. 4 shows an alternate scheme for light delivery using a single fiber optic cable 71. The light system 1000 mixes laser sources w1, w2, w3, 1011, 1013, 1015 with dicroic beam combiners 1217 and 1219 into gradient lens 71. This lens focuses the multiwavelength light into the fiber cable 73. At the other end, gradient lens 75 collimates the output 31 into the diffraction plate or computerized holographic plate 91 producing light beams 311, 313, 315. These beams are incident to a modulation system as described by Crowley supra. The fiber cable 73 could alternately be a diode-pumped, rare earth-doped fiber laser as discussed previously. This fiber laser would have to have laser transitions which would satisfy the requirements for the multicolor laser video projector of the present invention.

Figure 5:
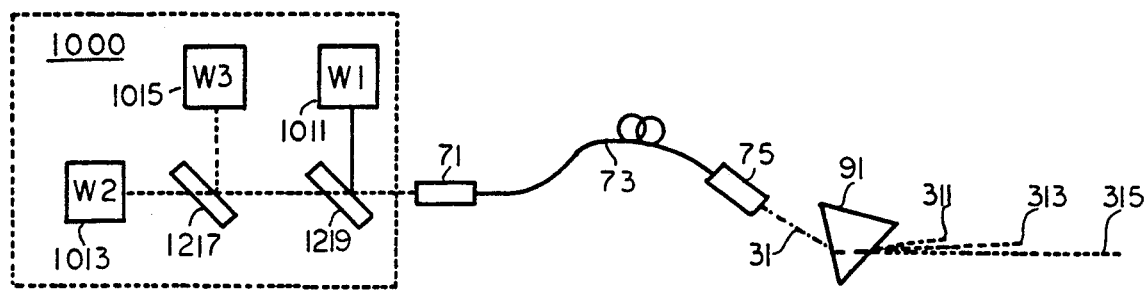
FIG. 5 is a schematic drawing of an alternate embodiment of a light delivery system used by the imaging system of FIG. 1 using a prism as an alternate to the grating plate.

Alternately, FIG. 5 replaces the holographic plate 91 of FIG. 4 with a prism 91 which essentially does the same effect in a larger package. As in the previous example, fiber cable 73 could also be a diode-pumped, rare earth-doped fiber laser.

Figure 6:
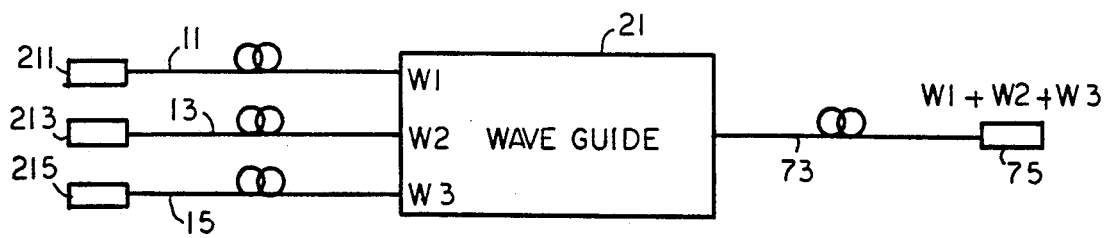
FIG. 6 is a schematic drawing of an alternate embodiment of a light delivery system used by the imaging system of FIG. 1 using a silica optical wave guide as an alternate to the mixing scheme of FIG. 4 and FIG. 5.

Alternately, FIG. 6 shows another scheme for light mixing and delivery using a silica wave guide as the mixing scheme. Fiber cables 11, 13, 15 are input to the wave guide 21 and mixes the light into fiber cable 73. Fiber cables 11, 13, 15 could also be diode-pumped, rare earth-doped lasers each producing different wavelengths which are mixed into one fiber cable 91.

Alternately, the fiber cable 31 could be the rare earth-doped fiber laser which produces multiple wavelengths using input fiber cables 11, 13 and 15 as multiple diode pumping sources which would produce three times more pumping energy for the fiber laser 31. It should also be noted that the number of input fibers to the wave guide could be more than the number shown, i.e. 3. Input fibers of 8 to 16 are common in the art.

Because of the continuing advances made by the diode laser technology, the fiber laser technology and the non-linear crystal technology, it must be stated that the general range of infrared diode frequencies needed can be achieved and that the ranges stated are in no means exhaustive.

For example, to produce a red light needed for the present invention, one could use either a visible red diode or diode array operated at a wavelength range of 630 nm to 670 nm, a diode close to the 630 nm line is most preferred. Although a diode array at 650 nm could be available in the near future of this writing.

The red light could also come from the upconversion (using the appropriate non-linear crystal) of the infrared wavelengths of a GaAlAs MOCVD diode or GaAlAs diode array tuned by chemistry and or temperature tuning in the range of 1220 nm to 1300 nm which would yield a red visible light in the range of 610 nm to 650 nm. The high luminous efficiency of the 610 nm line, approximately 343 lumens per watt, is the preferred wavelength, but the 650 nm would give us a better color gamut.

For the green light, since there are no known visible green diodes, the green light could come from the upconversion (using the appropriate non-linear crystal) of the infrared wavelengths of a GaAlAs MOCVD diode or GaAlAs diode array tuned by chemistry and/or temperature tuning in the range of 1020 nm to 1080 nm which would yield a green visible light in the range of 510 nm to 540 nm. The high luminous efficiency and the consideration of gamut would prefer the 540 nm line, approximately 650 lumens per watt.

For the blue light, since there are no known visible blue diodes, the blue light could come from the upconversion (using the appropriate non-linear crystal) of the infrared wavelengths of a diode or diode array tuned by chemistry and/or temperature tuning in the range 860 nm to 950 nm which would yield a blue visible light in the range of 430 nm to 475 nm. Because of the color gamut and the ratio of the red, green and blue needed to obtain the right color white (CIE standard), a diode or diode array tuned and frequency doubled to obtain a visible blue light at 450 nm is preferred. At this wavelength, approximately two percent (2%) of blue light would be needed to meet the CIE standard. The 450 nm line has approximately 41 lumens per watt.

There are many diode structures and chemistries, some of which include:

Chemistry GaAs, AlGaAs, InGaAs, AlGaInP.

Structures: MESFET, HEMT, HBT, SUPERLATTICE, MOVCD, LASER ARRAYS, QUANTUM WELL STRUCTURES, LASER BARS, 2D ARRAYS. Note that this list is by no means exhaustive.

A list of some non-linear crystals followed by the phase-matching type used in the embodiment of the present invention could be KDP type I, KDP type II, D-CDA type I, Urea type I, Urea type II, BBO type I, BBO type II, LAP type I, LiIO$^3$ type I, m-NA type I, MgO:LiNbO$^3$ type I, KTP type II, POM type I, MAP type I, KNbO$^3$ type II, COANP, DAN, Structure modulated LiNbO3, LiB$^3$O$_5$, KTiOAsO$_4$. Note that this list is by no means exhaustive. These non-linear crystals can be tuned by angle cut, temperature tuning, wave guides, etc.

Figure 7:
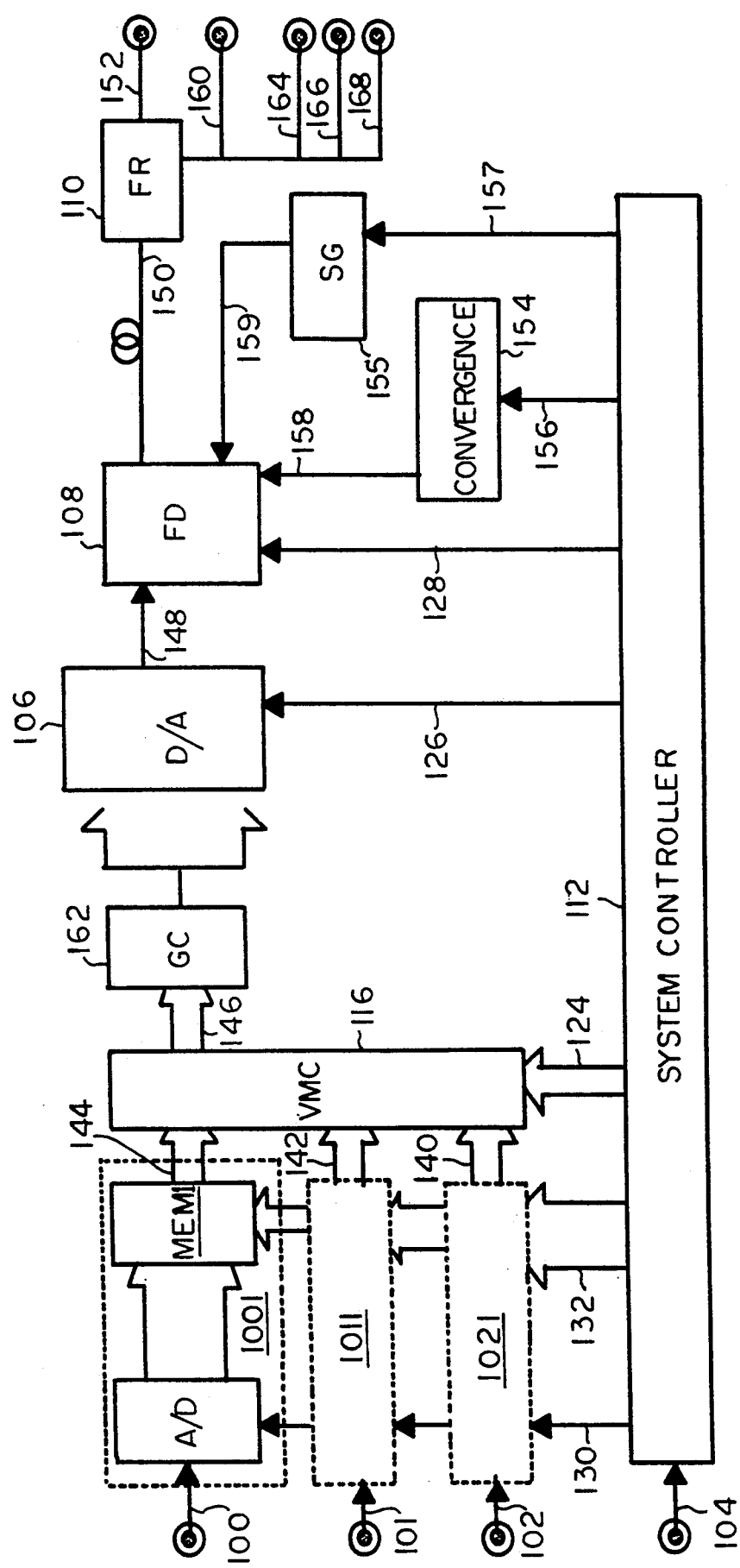
FIG. 7 is a block diagram showing the construction of the video multiplexer used in the multiplexed, multicolor imaging system of the preferred embodiment of the present invention.

Referring to FIG. 7 is shown a block diagram of the Video Multiplex Controller VMC. The scheme used in this block diagram uses a unique way to read out the video data. This important distinction allows the use of a single digital-to-analog converter to supply one multiplexed video signal to a single acoustic-optical modulation system in the present invention.

The input video is fed into the analog-to-digital converter A/D and first-in, first out FIFO memory MEM used in systems 1001, 1011, 1021 where the red, green and blue input analog video signals 100, 101, 102 are converted into digital video and stored creating signals 144, 142, 140 respectively. The sync signal 104 is connected to the system controller 112, which supplies the appropriate external sychronization needed. The write clock signal 130 for the A/D converter is derived from the system clock generated in the system controller 112. The system controller 112 also generates the FIFO control signals 132. The output video clock 126 clocks the output D/A 106, is the high speed read video clock for the FIFO memory and is used for the high speed control clock in the VMC. For example, the FIFO writes an input scan line which is approximately 63.5 us for NTSC and 31 us for HDTV and reads out a scan line which is approximately 10 us long. Three sequential scan lines of approximately 10 us equals the total input video time of 30 us for HDTV.

The control signals 132 are connected to the FIFO memory of systems 1001, 1011 and 1021. When a video scan line, data 100, 101, 102 (31 us for HDTV) is sampled by write clock 130, it is stored in the FIFO memory. At the same time, the previously stored video scan line is read out by output video clock signal 126. The VMC 116 reads out the RGB video data sequentially within the input scan line time by control signals 124. In the first 10 us, the read enable of signal 124 turns on the red video information. The second 10 us, the read enable of signal 124 turns on the green information, and the last 10 us the read enable of signal 124 turns on the blue information. The net result is a video output signal 146 that contains all of the red, green and blue video information to form a multicolored video projection. 10 us red+10 us green+10 us blue=30 us RBG multiplexed video output. Since the total output video time is less than the 31 us input video time, we can process all the information per scan line without losing any video data.

Also, it should be noted because the video data is sent to the acoustic-optical cell individually, maximum defraction efficiency is obtained for each of the red, green and blue signals being transmitted into the single transducer used in the acoustic-optical cell of the present invention contrary to the three transducers needed by the acoustic-optical cell used by Crowley supra to obtain full color.

The multiplexed video data 146 is fed into gamma corrector GC 162 which delinearizes and adjusts for the different wavelengths used to from the multicolored projection system of the present invention. This signal is then processed by the digital-to-analog converter D/A 106 which is clocked by signal 126. The output 148 from D/A 106, sync signal 128 and the convergence signal 158 all are transmitted by fiber optic driver 108. These signals are turned into light and are passed through fiber optic cable 150 and received by fiber receiver 110. The multiplexed video signal 152 is used to drive the acoustic-optical modulator video input. Signals 160 and 164 are the horizontal and vertical scanning sync respectively. Signal 166 is the vertical scanning signal that drives the acoustic-optical cell vertical VCO input and 168 is the convergence signal that drives the acoustic-optical horizontal VCO input.

Figure 8:
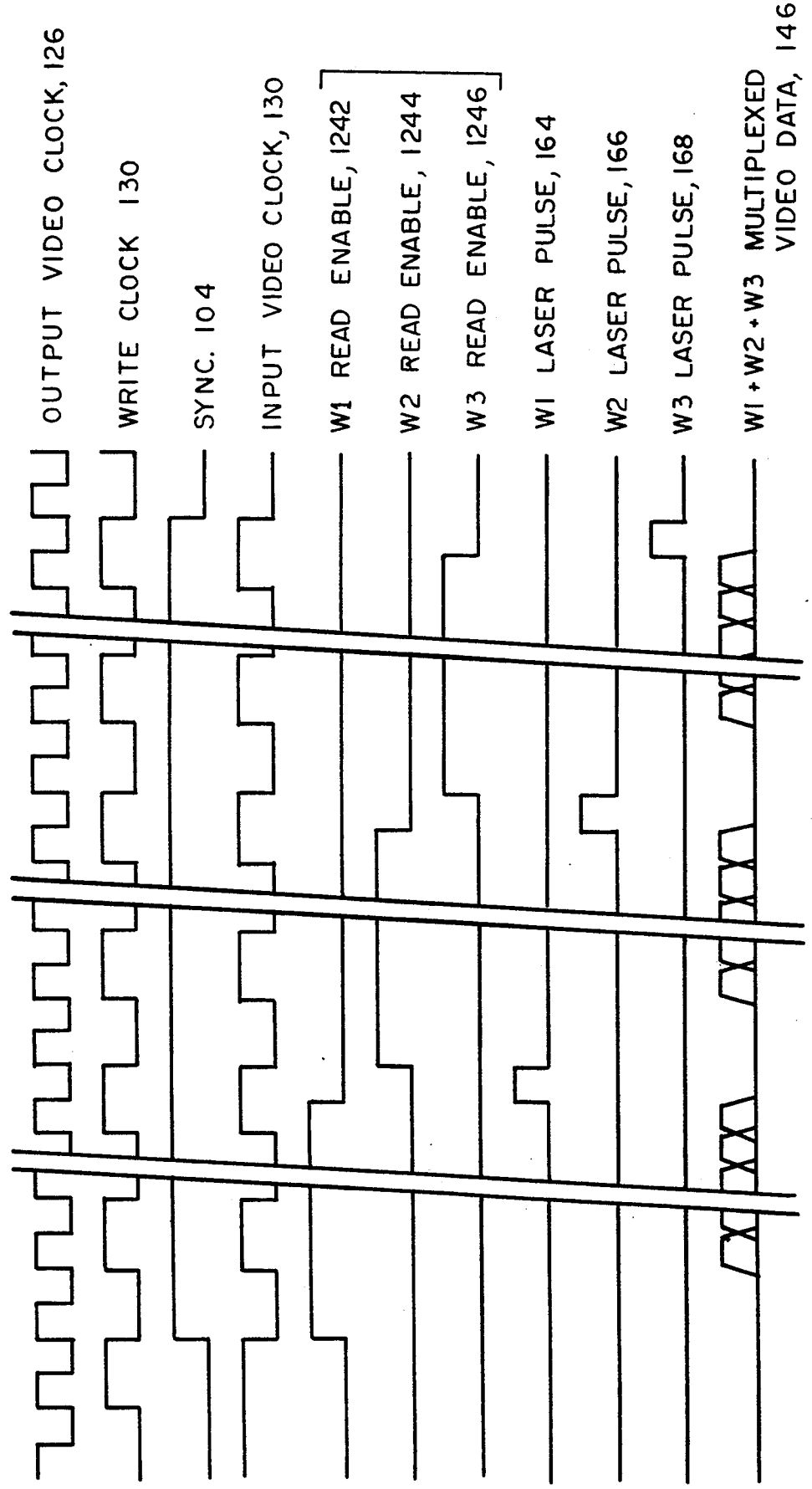
FIG. 8 is a timing diagram showing the timing signals of the video multiplexer and the multiple laser pulse timing used in the multiplexed, multicolor imaging system of the preferred embodiment of the present invention.

FIG. 8 shows the timing signals generated by the electronics of FIG. 7.

Although the system described in detail above is most satisfactory and preferred, many of these variations in structure and method are possible. Many of these variations have been set out above and are examples of possible changes or variations. Also, for example, the source for any color could consist of more than one laser having substantially the same, or similar, frequency. They are not to be considered exhaustive. The horizontal and vertical sync signals used as example may be of numerous combinations, such as, computer signals of any sort, NTSC, PAL, SECAM, HDTV or any other popular or future sync configurations that may be adopted as standards or not.

Because many and different embodiments may be made within the scope of the inventive concept herein taught and because modifications may be made in accordance with the descriptive requirements of the law, it should be understood that the details herein are to be interpreted as illustrative and not in a limiting sense.

What is claimed is:

1. A multiplexed, multicolored video imaging system, which system comprises:
   a) a light source which comprises a plurality of pulsed lasers to provide a plurality of multichromatic input light beams;
   b) a single acoustic-optical cell having an inlet face to receive the input light beam thereon and an outlet face to transmit a multichromatic, modulated light beam;
   c) an electrical signal to sound wave transducer mounted on a face other than the inlet and outlet faces of the cell to provide a modulated, multichromatic outlet light beam from the outlet face of the cell;
   d) signal means to drive said transducer to produce sound waves within the cell to correspond to the electrical signals used for a line of image;
   e) compression means to decrease the propagation time of the sound waves in the cell to less than the input video scan line time divided by the number of separate, different wavelengths of the input light beam;
   f) multiplexing electronic means to provide an electrical signal selected to correspond to each individual wavelength, which wavelengths are separately and sequentially modulated in the cell to multiplex the video signals, with the compressed time of the modulated, multichromatic output beam shorter than the input video time of the multichromatic input beam and to provide a multiplexed, modulated output light beam;

g) a projection surface to display on the surface a multicolored video image; and h) plane projector means to provide for each line of the multicolored, multiplexed, modulated output light beam to be produced at a different physical location.

2. The system of claim 1 which includes multiple visible, pulsed diode lasers to provide an inlet light beam having red, green and blue wavelengths.

3. The system of claim 1 wherein the light source comprises three diode-based lasers which are frequency multiplied from the invisible infrared to visible radiation region to provide a plurality of separate wavelengths.

4. The system of claim 1 wherein the pulsed lasers comprise three, frequency-doubled, diode-based, pulsed lasers to produce inlet light beams having red, green and blue wavelengths.

5. The system of claim 1 wherein the light source comprises a multiple pulsed diode laser pumped parametic oscillators to produce an inlet light beam having red, green and blue wavelengths.

6. The system of claim 1 wherein the light source comprises three individual frequency upconversion rare earth-doped fiber lasers to produce an inlet light beam having red, green and blue wavelengths.

7. The system of claim 3 wherein the light source comprises a multiple frequency upconversion in a single rare earth-doped fiber laser to produce an inlet light beam having red, green and blue wavelengths.

8. The system of claim 3 wherein the plurality of wavelengths from the diode-based, pumped lasers are mixed by dicroic beam combiners and provide a multichromatic input light beam.

9. The system of claim 1 wherein the multiplexing electronic means reads the wavelength frequencies sequentially between the longer and the shorter wavelengths.

10. The system of claim 1 wherein the multiplexing electronic means includes:
a) an RF signal generator means to generate a selected RF signal to the transducer;
b) a system control means to select an RF signal corresponding to each individual wavelength to be separately modulated; and
c) electronic means to amplitude modulate the selected RF signal for transmission to the signal means.

11. The system of claim 1 which includes a vertical scanner means for the vertical deflection of the multicolored, compressed, multiplexed, modulated output light beam to produce a full color video image on the surface of the projector screen.

12. The system of claim 11 which includes angle amplification means to increase the perpendicular scanning of the multicolored output light beam.

13. The system of claim 12 wherein the angle amplification means includes a computer-generated holographic lens means.

14. The system of claim 1 which includes a multiple fiber optic cable delivery means to transmit the multichromatic input light beam from the light source to the inlet face of the cell.

15. The system of claim 14 which includes collimator means to collimate the light source from the output of the fiber cable delivery system to provide a collimator beam and beam combiner means to mix the collimated light beam.

16. The system of claim 14 wherein the multiple fiber optic cable delivery system comprises a plurality of laser diode-pumped, rare earth-doped fiber lasers.

17. The system of claim 1 wherein the light source includes:
a) dicroic beam combiner to mix the separate wavelengths;
b) a gradient lens to focus the mixed light beam;
c) a single fiber optic cable having a one face and other outlet end, the mixed light beam focused on the inlet face;
d) a collimate means at the other output end of the fiber optic cable to collimate the mixed collimated light output beam; and
e) a diffraction plate, prism or holographic plate means to receive the collimated light output beam and to provide a dispersed light beam onto the acoustic-optical cell surface.

18. The system of claim 14 which includes a silica wave guide means to mix the input light beam from the multiple cables and a single fiber optic cell to receive and transmit the mixed input light beam.

19. The system of claim 1 wherein the light source includes three diode-pulsed lasers which comprise:
a) a diode-pulsed laser having a non-linear crystal tuned in the range of 1220 nm to 1300 nm to provide red visible light in the range of about 610 nm to 650 nm;
b) a diode-pulsed laser having a non-linear crystal tuned in the range of 1020 nm to 1080 nm to provide a green visible light in the range of about 510 nm to 540 nm; and
c) a diode-pulsed laser having a non-linear crystal tuned in the range of 860 nm to 950 nm to provide a visible blue light in the range of about 430 nm to 475 nm.

20. The system of claim 1 wherein the multiplexing means provides for the timed sequencing of the input light beam in time period for each input light beam of less than about 10 nanoseconds.

21. The system of claim 1 wherein the compression means provides for a speed of at least about 100 megacycles or lower.

22. The system of claim 1 which includes three pulsed lasers and three sound wave transducers to modulate each of the respective pulsed lasers.

23. A method for displaying a multicolor video image corresponding to electrical signals representing images onto a projection surface, which method comprises:
a) providing a plurality of pumped lasers as a light source and a plurality of separate wavelengths;
b) mixing the separate wavelengths from said lasers to provide a multicolored input light beam;
c) passing the subject light beam through a single acoustic-optical cell from an inlet face to an outlet face of the cell;
d) modulating the multicolored input light beam in the cell by a single electrical signal to sound wave transducer mounted on a cell face other than the inlet and outlet faces of the cell to provide a modulated, multichromatic outlet light beam;
e) providing a signal means to produce sound waves within the cell to correspond to the electrical signal used for the perpendicular scanning of a line of image;
f) compressing the modulated, multicolored input light beam in the cell to decrease the propagation time of the sound waves in the cell to less than the input video scan line time divided by the number of different wavelengths in the multicolored input light beam;

g) multiplexing by selecting a signal corresponding to each wavelength to modulate separately and sequentially each wavelength with the time of the modulated, multicolored outlet light beam from the cell shorter than the input video time of the input light beam; and h) displaying the modulated, multicolored outlet light beam on a projection surface with each line of the outlet light beam produced at a different location to provide a multicolor video image on the projector surface.

24. The method of claim 23 which includes providing as the light source three frequency-doubled, diode-based, pulsed lasers to provide inlet, light beams having red, green and blue wavelengths.

25. The method of claim 23 which includes reading the wavelength frequencies sequentially between the longer and shorter wavelengths.

26. The method of claim 23 which includes frequency multiplying the light source from the invisible infrared to visible radiation region to provide a plurality of separate wavelengths as the input beam.

27. The method of claim 23 which includes providing for the timed sequencing of the input light beam in a time period for each input light beam of less than about 10 nanoseconds.

* * * * *